(12) United States Patent
Sakai et al.

(10) Patent No.: US 9,762,839 B2
(45) Date of Patent: Sep. 12, 2017

(54) IMAGE CAPTURING APPARATUS, IMAGE CAPTURING SYSTEM, AND METHOD FOR DRIVING IMAGE CAPTURING APPARATUS

(71) Applicant: CANON KABUSHIKI KAISHA, Tokyo (JP)

(72) Inventors: Seiichirou Sakai, Yokohama (JP); Hideo Kobayashi, Tokyo (JP); Yu Maehashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/951,044

(22) Filed: Nov. 24, 2015

(65) Prior Publication Data

US 2016/0156860 A1     Jun. 2, 2016

(30) Foreign Application Priority Data

Dec. 1, 2014  (JP) ................................. 2014-243566

(51) Int. Cl.
*H04N 5/376* (2011.01)
*H04N 5/357* (2011.01)
*H04N 5/374* (2011.01)

(52) U.S. Cl.
CPC ........... *H04N 5/3765* (2013.01); *H04N 5/357* (2013.01); *H04N 5/3741* (2013.01)

(58) Field of Classification Search
CPC .... H04N 5/357; H04N 5/3658; H04N 5/3698; H04N 5/374; H04N 5/3741; H04N 5/378; H04N 5/3575; H04N 5/363; H04N 5/3765

See application file for complete search history.

(56) References Cited

U.S. PATENT DOCUMENTS

| | | | |
|---|---|---|---|
| 2008/0143860 A1* | 6/2008 | Sato | H04N 5/335 348/301 |
| 2014/0263966 A1* | 9/2014 | Hikosaka | H04N 5/3745 250/208.1 |

FOREIGN PATENT DOCUMENTS

JP        2010259027 A        11/2010

* cited by examiner

*Primary Examiner* — Paul Berardesca
(74) *Attorney, Agent, or Firm* — Canon USA, Inc. IP Division

(57) ABSTRACT

An image capturing apparatus includes a plurality of current sources each including a first transistor, a first switch, a second transistor connected to a vertical signal line via the first switch, and a second switch. The gate of the first transistor is connected to a common connecting line, and the gate of the second transistor is connected to the common connecting line via the second switch.

17 Claims, 13 Drawing Sheets

IMAGE CAPTURING APPARATUS, IMAGE CAPTURING SYSTEM, AND METHOD FOR DRIVING IMAGE CAPTURING APPARATUS

BACKGROUND OF THE INVENTION

Field of the Invention

The present invention relates to an image capturing apparatus, an image capturing system, and a method for driving the image capturing apparatus.

Description of the Related Art

Japanese Patent Laid-Open No. 2010-259027 discloses an image capturing apparatus including a plurality of pixels disposed in a matrix form, a plurality of vertical signal lines each provided for a corresponding one of the columns of the pixels, to which signals are output from the pixels, and a plurality of current sources that supply current to the corresponding plurality of vertical signal lines.

FIG. 10 of Japanese Patent Laid-Open No. 2010-259027 shows a configuration in which each of the plurality of current sources includes a first current source and a second current source that is switched between an operating state and a non-operating state in response to a current selection signal. Japanese Patent Laid-Open No. 2010-259027 describes a first operation in which the first current source supplies current to the vertical signal lines and a second operation in which the first current source and the second current source supply current to the vertical signal lines. In each of the plurality of current sources, the first current source and the second current source are connected to a common connecting line.

With the configuration of the current sources disclosed in Japanese Patent Laid-Open No. 2010-259027, the common connecting line changes in electric potential due to switching of the second current source between an operating state and a non-operating state. The changes in the potential of the common connecting line are conveyed to the first current source that supplies current to the vertical signal lines. This causes changes in the amount of current that the first current source supplies to the vertical signal lines. The changes in the amount of current on the vertical signal lines can disadvantageously cause changes in signals output from the pixels to the vertical signal lines.

SUMMARY OF THE INVENTION

According to an aspect of the present invention, an apparatus includes a plurality of pixels, a plurality of vertical signal lines, a plurality of current sources, and a reference current source. The plurality of pixels are arranged in rows and columns and each include a photoelectric conversion unit and an amplifying transistor to which an electric charge generated by the photoelectric conversion unit is input. The plurality of vertical signal lines are disposed in correspondence with the columns of the plurality of pixels and each connected to the amplifying transistor of each pixel in a corresponding one of the columns. The plurality of current sources are each connected to a corresponding one of the plurality of vertical signal lines. The reference current source is connected in common to the plurality of current sources through a first common connecting line. Each of the plurality of current sources includes a first transistor, a first switch, a second transistor, and a second switch. The first transistor is connected to a corresponding one of the vertical signal lines to constitute a source follower circuit together with the amplifying transistor. The second transistor is connected to a corresponding one of the vertical signal lines via the first switch to constitute a source follower circuit together with the amplifying transistor. A gate of the first transistor is connected to the first common connecting line. A gate of the second transistor is connected to the first common connecting line via the second switch.

Further features of the present invention will become apparent from the following description of exemplary embodiments with reference to the attached drawings.

DESCRIPTION OF THE EMBODIMENTS

Exemplary embodiments will now be described with reference to the drawings. Metal oxide semiconductor (MOS) transistors in the following embodiments are NMOS transistors unless otherwise noted. The MOS transistors according to the following embodiments may also be PMOS transistors, in which case electric potentials applied to the gate, the source, and the drain are changed as appropriate from potentials shown in the embodiments.

First Embodiment

Figure 1:
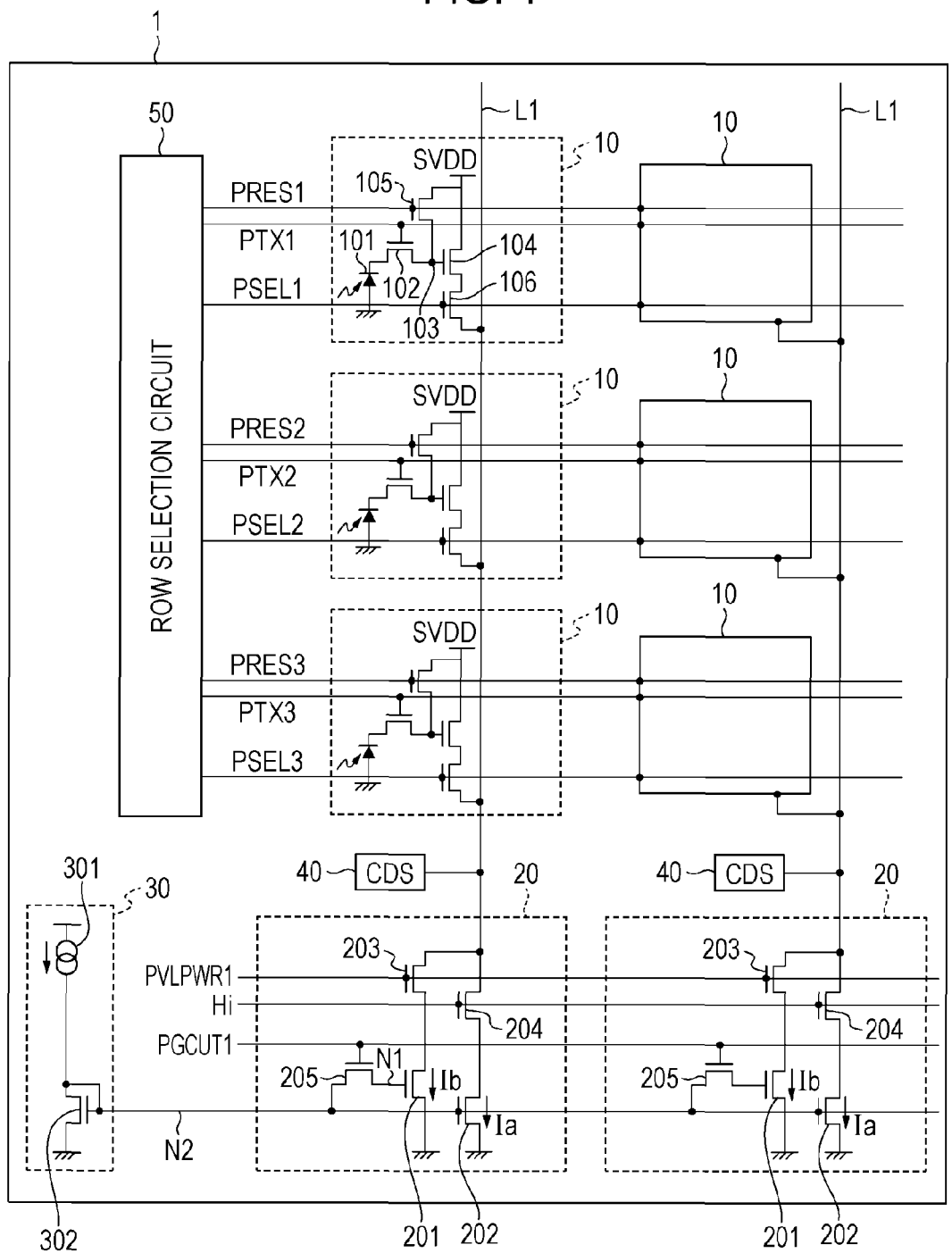
FIG. 1 is a diagram showing the configuration of an image capturing apparatus according to a first embodiment of the present invention.

FIG. 1 is a diagram showing the configuration of an image capturing apparatus 1 according to a first embodiment. The image capturing apparatus 1 of this embodiment includes pixels 10, current sources 20, a reference current source 30, correlated double sampling (CDS) circuits (difference circuits) 40, and a row selection circuit 50.

The plurality of pixels 10 are disposed in a matrix form. Pixels 10 in the same column are connected to a corresponding one of the vertical signal lines L1. Each of the pixels 10 includes a photoelectric conversion unit 101, a transfer transistor 102, a charge-voltage conversion unit 103, an amplifying transistor (output unit) 104, a reset transistor 105, and a selection transistor 106.

The photoelectric conversion unit 101 generates electric charge responsive to incident light through photoelectric conversion. An example of the photoelectric conversion unit 101 is a photodiode. The anode of the photoelectric conversion unit 101 is grounded, and the cathode of the photoelectric conversion unit 101 is connected to the transfer transistor 102. When an active signal PTX is input to the gate of the transfer transistor 102, the transfer transistor 102 transfers the electric charge generated by the photoelectric conversion unit 101 to the charge-voltage conversion unit 103. The charge-voltage conversion unit 103 converts the electric charge transferred by the transfer transistor 102 to voltage. An example of the charge-voltage conversion unit 103 is a floating diffusion. The gate of the amplifying transistor 104 is electrically connected to the charge-voltage conversion unit 103. The amplifying transistor 104 outputs a signal based on the electric charge transferred from the transfer transistor 102 to the charge-voltage conversion unit 103. The amplifying transistor 104 is connected to a power source SVDD. The amplifying transistor 104 is connected to the vertical signal line L1 via the selection transistor 106. Among the amplifying transistors 104 of the plurality of pixels 10 connected to the vertical signal line L1, the amplifying transistors 104 of pixels 10 whose selection transistors 106 are on output signals to the vertical signal line L1. The selection transistors 106 are turned on when an active signal PSEL is input to the gates thereof. The reset transistors 105 reset the potentials of the corresponding charge-voltage conversion units 103 during a predetermined period. Each of the reset transistors 105 is connected to the power source SVDD at the drain and is connected to the charge-voltage conversion unit 103 at the source. The reset transistor 105 is turned on when an active signal PRES is input to the gate of the active reset transistor 105. This causes the potential of the charge-voltage conversion unit 103 to be reset to a potential responsive to the power source SVDD.

The photoelectric conversion units 101 of the pixels 10 of this embodiment have different sensitivities among different rows. Specifically, the pixels 10 in the first row each have a high-sensitivity photoelectric conversion unit 101 and the pixels 10 in the second row each have a low-sensitivity photoelectric conversion unit 101. The high sensitivity and low sensitivity indicate that, when the same quantity of light is incident on the pixels 10, the amount of electric charge generated by the photoelectric conversion unit 101 is larger in the pixels 10 in the first row than the pixels 10 in the second row. Such a configuration can be achieved by, for example, setting the area of a light shielding portion provided in the optical path of incident light in each of the photoelectric conversion units 101 of the pixels 10 in the first row smaller than the area of a light shielding portion provided in the optical path of incident light in each of the photoelectric conversion units 101 of the pixels 10 in the second row. The pixels 10 in the third row each include a high-sensitivity photoelectric conversion unit 101, and the pixels 10 in the fourth row each include a low-sensitivity photoelectric conversion unit 101. The image capturing apparatus 1 of this embodiment uses signals output from low sensitivity pixels 10 for capturing an image of a high-luminance object, and uses signals output from high sensitivity pixels 10 for capturing an image of a low-luminance object. This allows the image capturing apparatus 1 of this embodiment to capture an image in a wider dynamic range than that with an image capturing apparatus including uniform-sensitivity pixels 10.

The row selection circuit 50 output a signal PSEL1, a signal PRES1, and a signal PTX1 to the pixels 10 in the first row. The row selection circuit 50 outputs a signal PSEL2, a signal PRES2, and a signal PTX2 to the pixels 10 in the second row. The row selection circuit 50 outputs a signal PSEL3, a signal PRES3, and a signal PTX3 to the pixels 10 in the third row.

The reference current source 30 includes a current generation unit 301 disposed close to the power source and a transistor 302 disposed closer to the ground potential with respect to the current generation unit 301.

The current sources 20 are provided on the individual vertical signal lines L1. Each of the current sources 20 includes a transistor 201, which is a load MOS transistor (current source transistor), and a transistor 202, which is a load MOS transistor (current source transistor). The gates of the transistors 202 in the plurality of columns are connected in common to the gate of the transistor 302 of the reference current source 30 with a common connecting line N2. Each current source 20 further includes a transistor 203, which switches between conduction and non-conduction between the vertical signal line L1 and the transistor 201, and a transistor 204, which switches between conduction and non-conduction between the vertical signal line L1 and the transistor 202. The current source 20 further includes a transistor 205 that switches between conduction and non-conduction between the gate of the transistor 201 and the common connecting line N2. The transistor 203 is a first switch of the current source 20. The transistor 205 is a second switch of the current source 20.

The transistor 302 and the transistors 201 and 202 of the current source 20 constitute a current mirror circuit. Specifically, the sources of the transistor 302 and the transistors 201 and 202 are each given a GND potential. The gate of the transistor 302 is connected to the gates of the transistors 202 of the individual current sources 20 and to the gates of the transistors 201 via the transistors 205. The gate of the transistor 302 is further connected to the drain of its own.

Current output from the current generation unit 301 is received by the transistor 302. The transistor 201 and the transistor 202 supply a current having a magnitude proportional to the magnitude of the current that the transistor 302 receives to the vertical signal line L1. In other words, the transistor 302, the transistor 201, and the transistor 202 constitute a current mirror circuit. Let Ib be the amount of current that the transistor 201 passes through the vertical signal line L1, and Ia be the amount of current that the transistor 202 passes through the vertical signal line L1.

The gate of the transistor 203 is given a signal PVLPWR1 from a timing generator (not shown). The gate of the transistor 205 is given a signal PGCUT1 from the timing generator. The gate of the transistor 204 is given a high-level (hereinafter referred to as Hi-level) signal that turns on the transistor 204 from the timing generator. The gate of the transistor 204 is continuously given the Hi-level signal from the timing generator during the period of reading signals from the pixels 10.

If the signal PVLPWR1 is at a low level (hereinafter referred to as Lo level) during the period of reading signals from the pixels 10, the amount of current supplied to the vertical signal line L1 is Ia. In contrast, if the signal PVLPWR1 is at Hi level, the amount of current supplied to the vertical signal line L1 is Ia+Ib. When the signal PVLPWR1 is at Lo level, the transistor 202 and the amplifying transistor 104 constitute a source follower circuit. In contrast, when the signal PVLPWR1 is at Hi level, the transistor 201, the transistor 202, and the amplifying transistor 104 constitute a source follower circuit.

The gate of the transistor 205 is given a signal PGCUT1 from the timing generator. If the signal PGCUT1 is at Lo level, the transistor 205 is off. Accordingly, the electrical path between a node N1, which is the gate of the transistor 201, and the common connecting line N2 is non-conducting.

The CDS circuit 40 performs a correlated double sampling process for calculating the difference between a noise signal and a photoelectric conversion signal of the same pixel 10 to acquire an image signal in which a noise component is reduced from the photoelectric conversion signal. More specifically, the noise signal is a signal output to the vertical signal line L1 in a state in which the charge-voltage conversion unit 103 is reset. The photoelectric conversion signal is a signal output to the vertical signal line L1 in a state in which the electric charge of the photoelectric conversion unit 101 is transferred to the charge-voltage conversion unit 103 by the transfer transistor 102.

Next, the operation of the image capturing apparatus 1 will be described with reference to FIG. 2.

Figure 2:
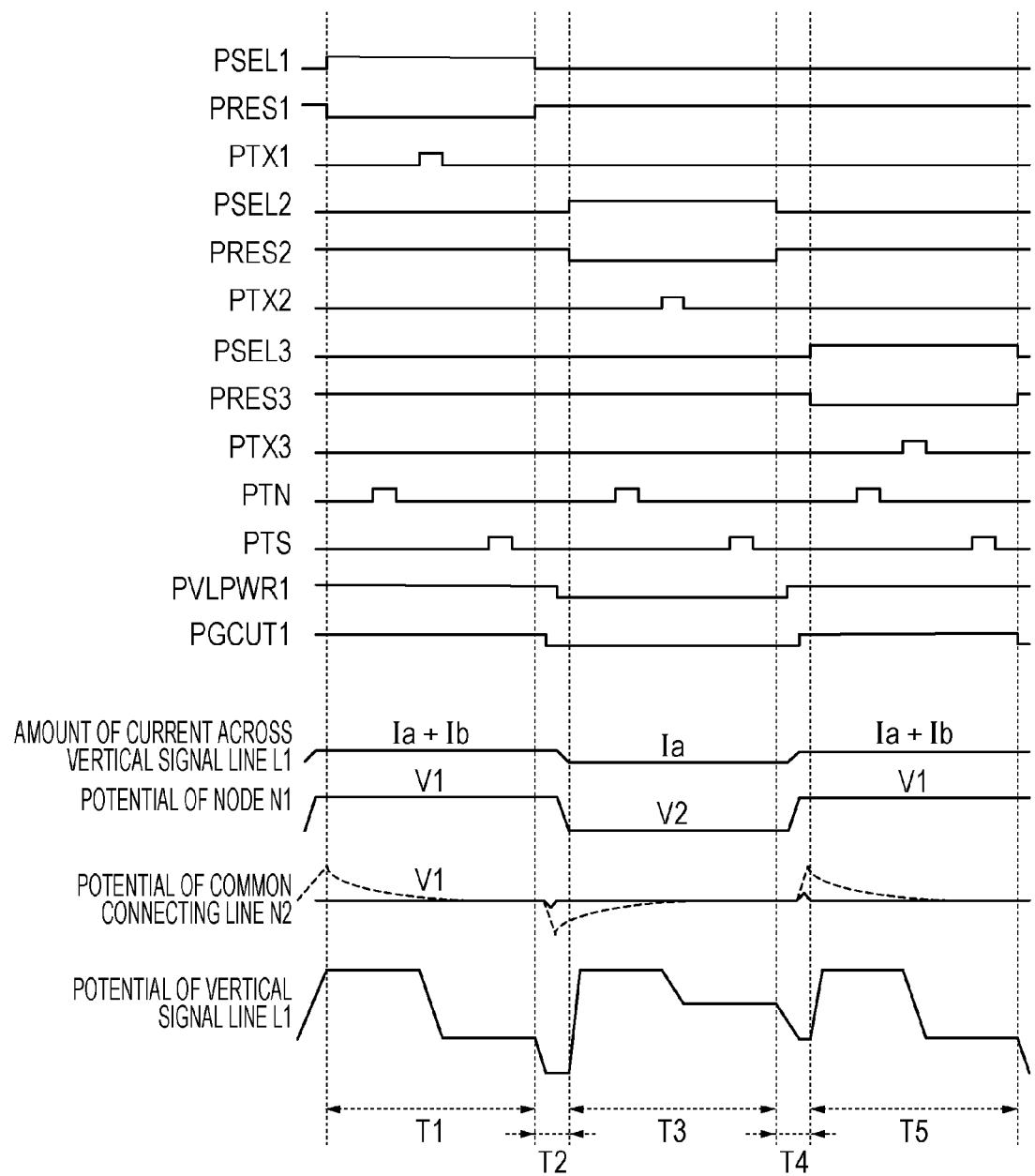
FIG. 2 is a diagram showing the operation of the image capturing apparatus according to the first embodiment of the present invention.

In FIG. 2, "PSEL1" to "PGCUT1" correspond to the signals shown in FIG. 1 except a signal PTN and a signal PTS. The signals PTN and PTS are signals applied from the timing generator to the CDS circuit 40. In FIG. 2, the potential of the common connecting line N2 indicated by the solid line is a potential in this embodiment, and the potential indicated by the broken line is a potential in a comparative example.

In the operation shown In FIG. 2, the amount of current flowing through the vertical signal line L1 is Ia for reading signals from low-sensitivity pixels 10, and Ia+Ib for reading signals from high-sensitivity pixels 10. This makes reading of signals output from the high-sensitivity pixels 10, in which the amplitude of the photoelectric conversion signals is more likely to be larger than that of low-sensitivity pixels 10, faster than the case where the amount of current flowing through the vertical signal line L1 is Ia.

During time T1, the timing generator brings the signal PVLPWR1 and the signal PGCUT1 to Hi level. This causes the transistor 201 and the transistor 202 to supply current to the vertical signal line L1. This allows current with an amount of Ia+Ib to flow through the vertical signal line L1.

During time T1, the row selection circuit 50 shifts the signal PRES1 applied to the reset transistors 105 of the pixels 10 in the first row from Hi level to Lo level. This causes the reset transistors 105 to be switched from on to off, and the reset of the charge-voltage conversion units 103 is cancelled.

During time T1, the row selection circuit 50 brings the signal PSEL1 applied to the selection transistors 106 of the pixels 10 in the first row to Hi level. This causes the amplifying transistors 104 of the pixels 10 in the first row to perform a source follower operation together with the current sources 20. This causes the amplifying transistors 104 to output noise signals based on a potential at a reset level of the charge-voltage conversion units 103 to the vertical signal lines L1.

The CDS circuits 40 hold the noise signals output from the amplifying transistors 104 of the pixels 10 in the first row in response to the signal PTN at Hi level supplied from the timing generator.

Thereafter, the row selection circuit 50 brings the signal PTX1 applied to the transfer transistors 102 to Hi level. This causes the transfer transistors 102 to be turned on. This allows electric charge generated by the photoelectric conversion units 101 to be transferred to the charge-voltage conversion units 103. The potentials of the charge-voltage conversion units 103 decrease to a potential level according to the amount of electric charge (here, electrons) generated by the photoelectric conversion unit 101. The amplifying transistors 104 output photoelectric conversion signals to the vertical signal lines L1 on the basis of the potentials of the charge-voltage conversion units 103. This makes the potentials of the vertical signal lines L1 lower than that in a state in which the signal PTX1 is at Lo level.

The CDS circuits 40 hold photoelectric conversion signals output from the amplifying transistors 104 of the pixels 10 in the first row in response to the signal PTS at Hi-level supplied from the timing generator.

The CDS circuits 40 each output an image signal, which is a difference signal between the photoelectric conversion signal and the noise signal, to a downstream circuit.

The row selection circuit 50 then brings the signal PSEL1 to Lo level and the signal PRES1 to Hi level. Thus, the reading of signals from the pixels 10 in the first row ends.

Next, during time T2, the timing generator brings the signal PGCUT1 to Lo level and then brings the signal PVLPWR1 to Lo level. This causes the transistors 201 to supply no current to the vertical signal lines L1. The vertical signal lines L1 are supplied with current from the transistors 202. Thus, the amount of current flowing through the vertical signal lines L1 is Ia. Since the current Ib does not flow through the transistors 201, the channel of each transistor 201 is eliminated. This changes the potential at the node N1 from a potential V1 toward the GND potential via parasitic capacitance Cgs between the gate and the source of the transistor 201 to a potential V2.

The potential of the common connecting line N2 temporarily changes toward the GND potential because the signal PGCUT1 changes from Hi level to Lo level. Thereafter, the reference current source 30 operates to reduce the changes in the potential, so the potential of the common connecting line N2 returns to the initial potential V1.

A comparative example will now be described. The comparative example does not include the transistor 205, so that the gate of the transistor 201 is directly connected to the common connecting line N2. With this configuration, the potential of the common connecting line N2 behaves as indicated by the dotted line shown in FIG. 2. The reason will now be described.

In this comparative example, when the potential of the node N1 changes from the potential V1 to the potential V2, the potential of the common connecting line N2 changes more than that in this embodiment due to the gate capacitance of the transistor 201.

The gate capacitances of the individual transistors 201 of the current sources 20 in a plurality of columns are connected to the common connecting line N2. Depending on the number of pixels in the image capturing apparatus, the gate capacitances of transistors 201 in thousands of columns can be connected to the common connecting line N2. This leads to a larger CR time constant of the common connecting line N2 in the comparative example than that of this embodiment. This takes much time to settle changes in the potential of the common connecting line N2. In this comparative example, noise signals from the pixels 10 in the second row are read before the changes in the potential of the common connecting line N2 is settled. This causes the noise signals to be affected by the changes in the potential of the common connecting line N2. In the reading of photoelectric conversion signals from the pixels 10 in the second row of the comparative example, the changes in the potential of the common connecting line N2 has already been settled. This reduces the probability of influence of the changes in the potential of the common connecting line N2 on the photoelectric conversion signals. Accordingly, the amount of noise components in the noise signals and the amount of noise components in the photoelectric conversion signals differ by an amount corresponding to the changes in the potential of the common connecting line N2. This causes the noise components corresponding to the changes in the potential of the common connecting line N2 to be left in image signals that the CDS circuits 40 generate, which are difference signals between the photoelectric conversion signals and the noise signals. This decreases the quality of an image generated using the image signals.

In a comparative example, a decrease in the image generated from the image signals can be prevented by reading noise signals from the pixels 10 after changes in the potential of the common connecting line N2 are settled. However, this causes a waiting time to wait for the settlement of the changes in the potential of the common connecting line N2 before the noise signals are read from the pixels 10. This waiting time hinders high-speed reading of signals from the pixels 10.

In a comparative example, the gates of the transistors 201 and the transistors 202 may be set small to decrease the CR time constant. However, transistors having a small gate area are prone to cause a binary or multivalued discrete noise called a random telegraph signal (RTS) noise. The RTS noise generated in the transistors 201 and the transistors 202 causes changes in the amount of current on the vertical signal lines L1, leading to changes in signals output from the pixels 10. This results in generation of vertical streaks in the image generated using signals output from the image capturing apparatus 1. Thus, decreasing the gate areas of the transistors 201 and 202 in the image capturing apparatus will degrade the image quality.

In contrast, the image capturing apparatus 1 of this embodiment includes the transistor 205 that brings the electrical path between the gate of the transistor 201 and the common connecting line N2 out of conduction. This makes it difficult to convey the changes in the potential of the node N1 from the potential V1 to the potential V2 to the common connecting line N2. This makes the changes in the potential of the common connecting line N2 smaller than that of the comparative example. This allows the image capturing apparatus 1 of this embodiment to be less prone to degrade in the quality of the image due to the changes in the potential of the node N1 than the comparative example.

In the image capturing apparatus 1 of this embodiment, the signal PGCUT1 is brought to Lo level and then the signal PVLPWR1 is brought to Lo level. This allow the image capturing apparatus 1 of this embodiment to make the changes in the potential of the common connecting line N2 less prone to occur than a case in which the signal PGCUT1 and the signal PVLPWR1 are brought to Lo level at the same time. Furthermore, this allows the image capturing apparatus 1 of this embodiment to make the changes in the potential of the common connecting line N2 less prone to occur than a case in which the signal PVLPWR1 is brought to Lo level and then the signal PGCUT1 is brought to Lo level.

During time T4, the timing generator brings the signal PVLPWR1 to Hi level and then brings the signal PGCUT1 to Hi level. This causes the transistors 201 and the transistors 202 to supply current to the vertical signal lines L1. Thus, the amount of current supplied to the vertical signal lines L1 is Ia+Ib.

The presence of the transistors 205 in the image capturing apparatus 1 of this embodiment allows for reducing the changes in the potential of the common connecting line N2, which is caused by the transition of the signal PVLPWR1 from Lo level to Hi level, also during time T4 more than the comparative examples.

The current sources 20 of this embodiment each include a second switch that brings the electrical path between the gate of a second current source transistor that switches between operating and non-operating states and the common connecting line N2 connected to the gate of a first current source transistor in operation out of conduction. The second current source transistor that switches between operating and non-operating states is the transistor 201. The first current source transistor in operation is the transistor 202. The second switch is the transistor 205. Thus, the image capturing apparatus 1 of this embodiment reduces in changes in the potential of the gate of the first current source transistor, which is caused by switching of the second current source transistor between operating and non-operating states, by turning the second switch off. This reduces changes in the current of the vertical signal line L1, which is cause by switching of the second current source transistor between operating and non-operating states. This allows the image capturing apparatus 1 of this embodiment to reduce an influence of the changes in the current of the vertical signal line L1 on signals output from the pixels 10. This allows the image capturing apparatus 1 of this embodiment to reduce degradation of an image generated from the image signals.

The image capturing apparatus 1 of this embodiment achieves the configuration in which the pixels 10 have different sensitivities among different rows by disposing light shielding portions with different areas above the photoelectric conversion units 101. Alternatively, the charge-voltage conversion factor of the charge-voltage conversion unit 103, specifically, the capacitance value of the charge-voltage conversion unit 103, may differ among the rows of the pixels 10.

Although each of the current sources 20 in the individual columns of this embodiment includes two current source transistors, the transistor 201 and the transistor 202, it may include more current source transistors. In this case, the image capturing apparatus 1 may include more switches for switching between conducting and non-conducting states of the electrical path between the gate of the current source transistor that switches between operating and non-operating states and the common connecting line N2.

This embodiment shows a configuration in which one current source 20 is provided for one vertical signal line L1. In another example, the image capturing apparatus 1 of this embodiment may include one current source 20 for a plurality of vertical signal lines L1.

Second Embodiment

An image capturing apparatus 1 according to a second embodiment will be described, focusing on differences from the first embodiment.

Figure 3:
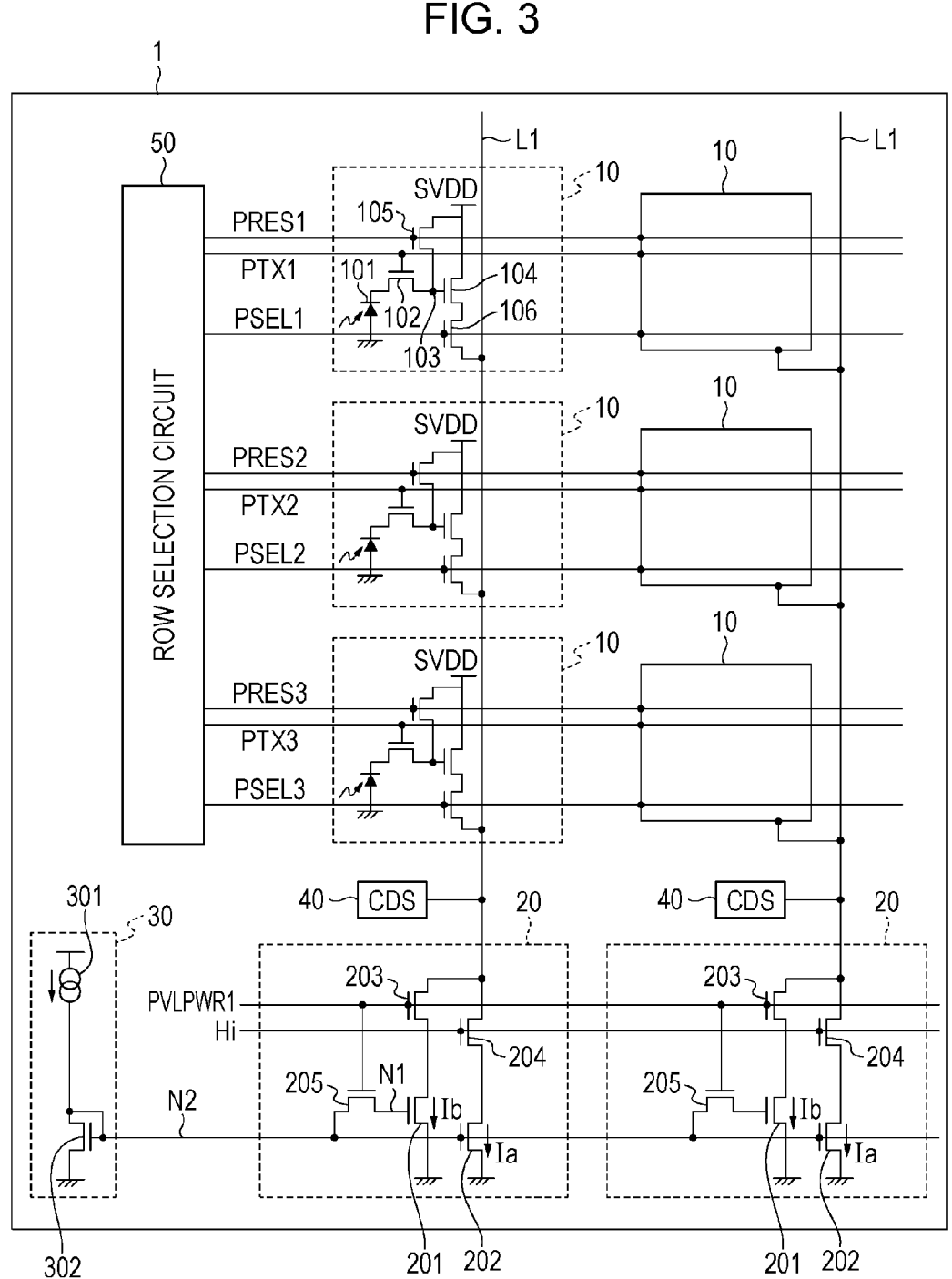
FIG. 3 is a diagram showing the configuration of an image capturing apparatus according to a second embodiment of the present invention.

FIG. 3 is a diagram showing the configuration of the image capturing apparatus 1 of this embodiment. The image capturing apparatus 1 of this embodiment differs in that the gate of the transistor 205 is given the signal PVLPWR1 instead of the signal PGCUT1.

Figure 4:
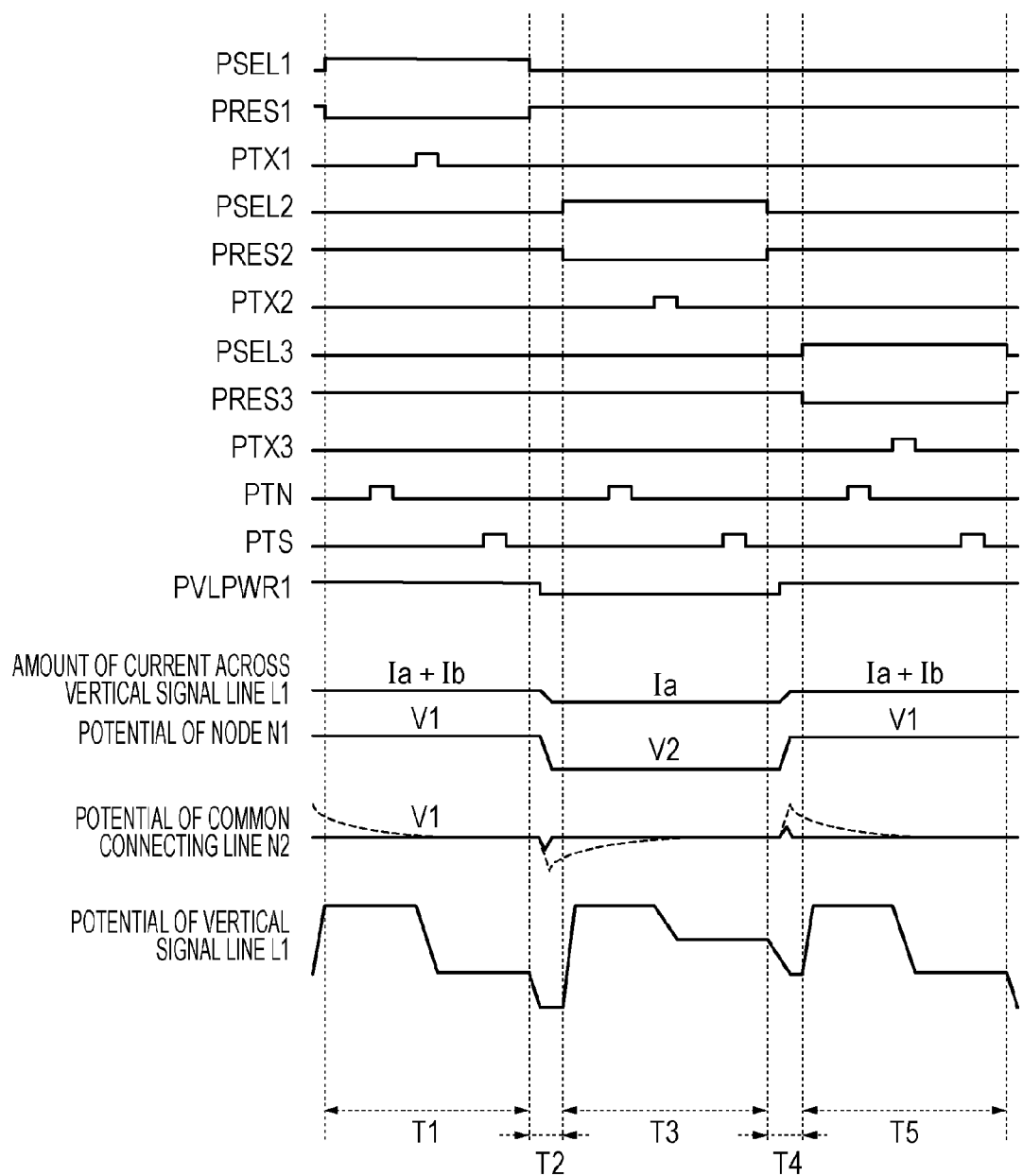
FIG. 4 is a diagram showing the operation of the image capturing apparatus according to the second embodiment of the present invention.

Next, the operation of the image capturing apparatus 1 will be described with reference to FIG. 4. Operations on the signal PSEL1 to signal PTS are the same as those of the first embodiment. Operation on the signal PVLPWR1 during time T1, time T3, and time T5 is also the same as that of the first embodiment.

During time T2, the timing generator brings the signal PVLPWR1 to Lo level. This causes the transistor 203 and the transistor 205 to be turned off at the same time. This allows the image capturing apparatus 1 of this embodiment to reduce in the changes in the potential of the common connecting line N2 due to the non-operation of the transistor 201 as compared with the configuration in which the gate of the transistor 201 is directly connected to the common connecting line N2.

This embodiment does not include the control wire for transmitting the signal PGCUT1 in contrast to the first embodiment. This allows the circuit area of the plurality of current sources 20 to be reduced. The image capturing apparatus 1 of this embodiment has the effect of increasing the flexibility of layout of the other control wires because the number of control wires can be reduced.

In this embodiment, the timing at which the transistor 205 is turned off is the same as the timing at which the transistor 203 is turned off. This can cause changes in the potential of the node N1 of the transistor 201 to be conveyed to the common connecting line N2 more than that with the configuration and operation of the first embodiment. Therefore, the configuration of the image capturing apparatus 1 may be selected from this embodiment and the first embodiment depending on the limitation on the chip size of the image capturing apparatus 1 and conditions required for the image capturing apparatus 1, such as the accuracy of image signals required for the image capturing apparatus 1.

Third Embodiment

An image capturing apparatus 1 according to a third embodiment will be described, focusing on differences from the second embodiment.

Figure 5:
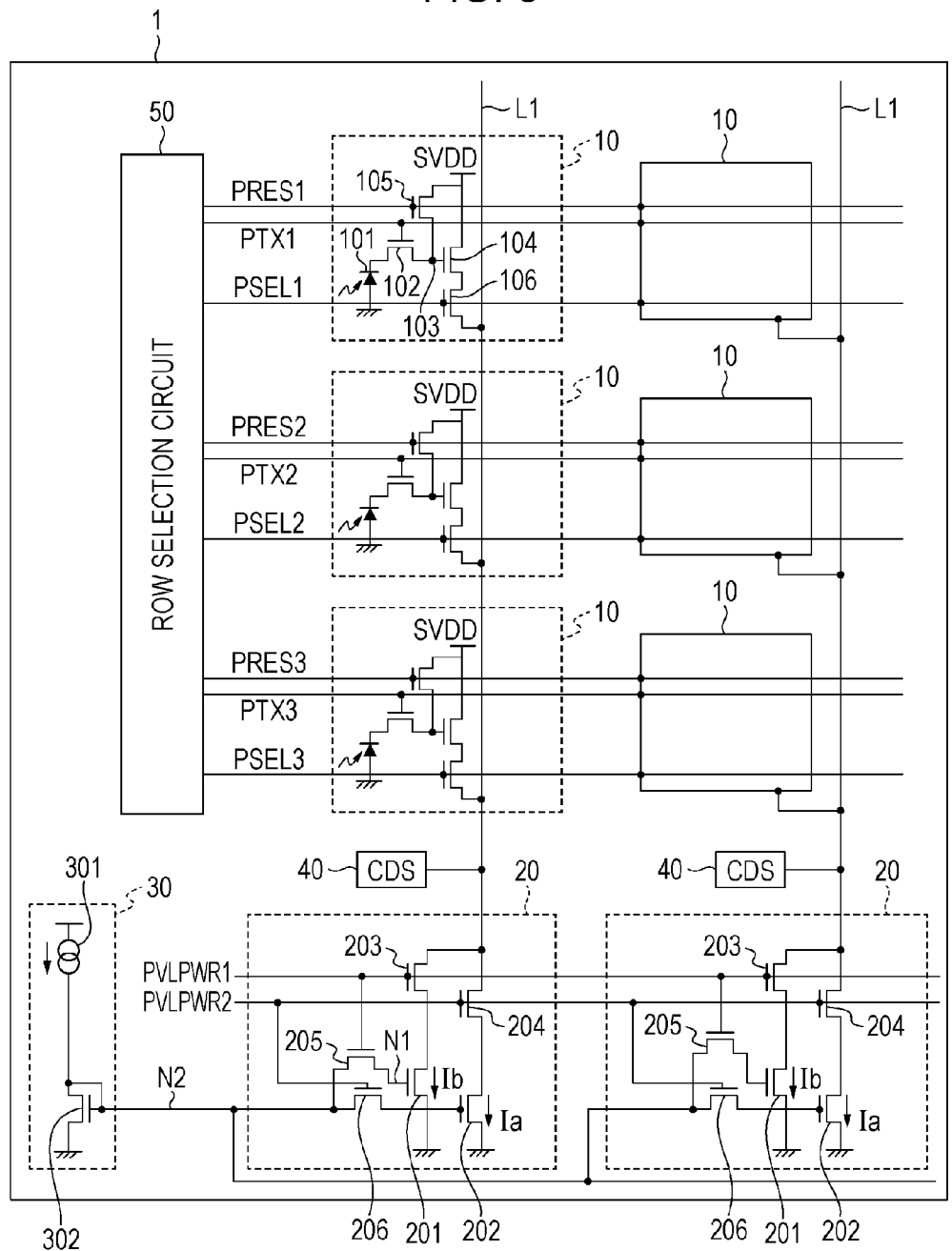
FIG. 5 is a diagram showing the configuration of an image capturing apparatus according to a third embodiment of the present invention.

FIG. 5 is a diagram showing the configuration of the image capturing apparatus 1 of this embodiment.

The image capturing apparatus 1 of this embodiment includes a transistor 206 that switches between conducting and non-conducting states between the common connecting line N2 and the gate of the transistor 202. The transistor 206 is a third switch. The gate of the transistor 202 and the gate of the transistor 204 are each given a signal PVLPWR2 from the timing generator.

In this embodiment, the ratio of the gate width W to the gate length L, W/L, of the transistor 201 is larger than that of the transistor 202. This causes the amount Ib of current flowing through the transistor 201 to be larger than the amount Ia of current flowing through the transistor 202.

Figure 6:
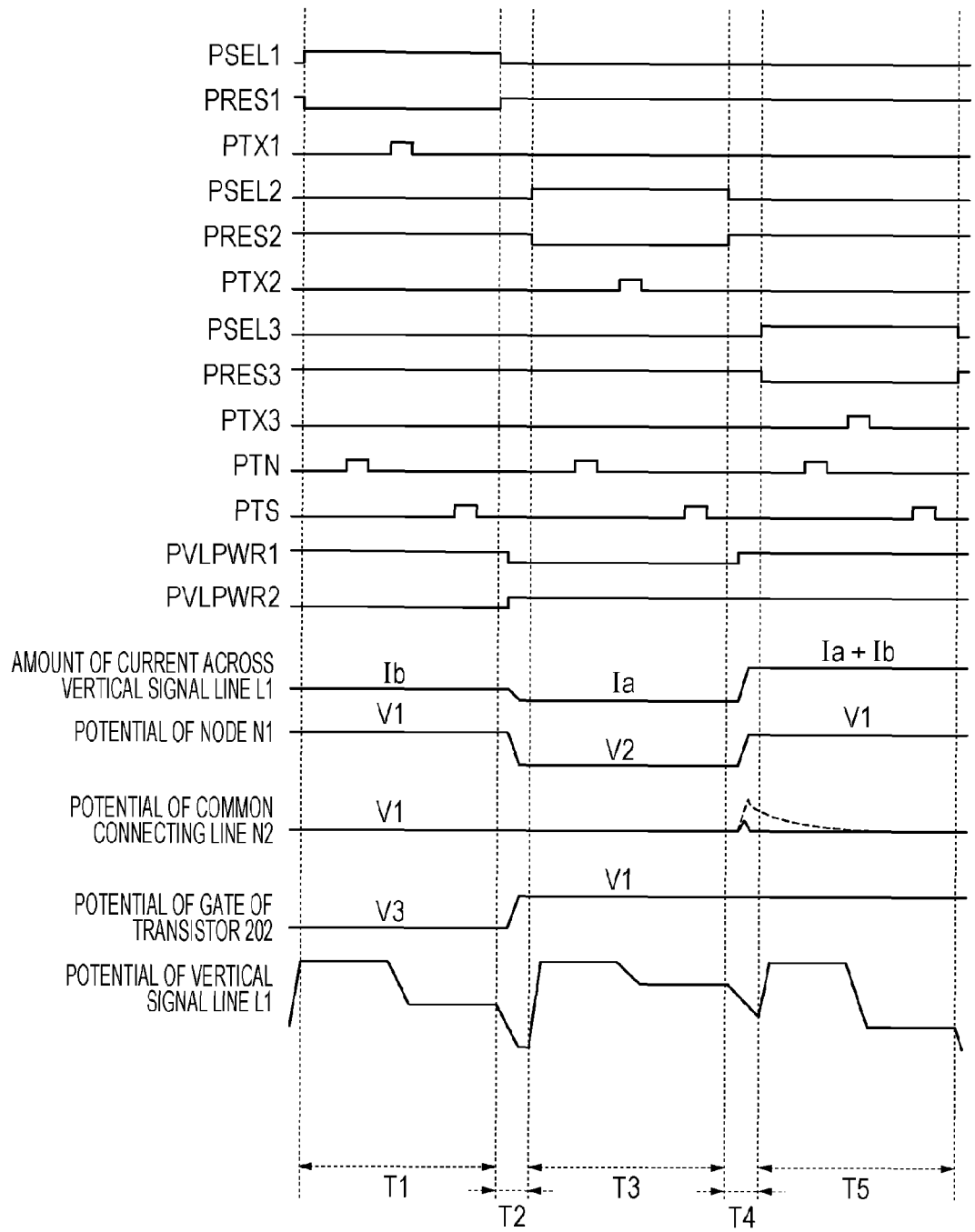
FIG. 6 is a diagram showing the operation of the image capturing apparatus according to the third embodiment of the present invention.

Next, the operation of the image capturing apparatus 1 according to this embodiment will be described with reference to FIG. 6.

During time T1, the timing generator brings the signal PVLPWR1 to Hi level and the signal PVLPWR2 to Lo level. This causes the transistor 202 to supply no current to the vertical signal line L1 and the transistor 201 to supply current to the vertical signal line L1 during time T1. Thus, the amount of current flowing through the vertical signal line L1 is Ib.

During time T3, the timing generator brings the signal PVLPWR1 to Lo level and the signal PVLPWR2 to Hi level. This causes the transistor 201 to supply no current to the vertical signal line L1 and the transistor 202 to supply current to the vertical signal line L1 during time T3. Thus, the amount of current flowing through the vertical signal line L1 is Ia.

During time T5, the timing generator brings the signal PVLPWR1 to Hi level and keeps the signal PVLPWR2 at Hi level. This causes the transistor 201 and the transistor 202 to supply current to the vertical signal line L1 during time T5. Thus, the amount of current flowing through the vertical signal line L1 is Ia+Ib. In other words, the amount of current flowing through the vertical signal line L1 differs among times T1, T3, and T5.

Next, an operation when the amount of current flowing through the vertical signal line L1 changes will be described.

During time T2, the timing generator changes the signal PVLPWR1 from Hi level to Lo level and the signal PVLPWR2 from Lo level to Hi level. This causes the transistor 205 to bring the electrical path between the node N1 and the common connecting line N2 out of conduction and causes the transistor 206 to bring the electrical path between the transistor 202 and the common connecting line N2 into conduction. This makes it difficult to convey changes in the potential of the node N1 to the common connecting line N2 and the gate of the transistor 202 as compared with the case in which the gate of the transistor 201 and the gate of the transistor 202 are directly connected.

The image capturing apparatus 1 of this embodiment operates such that the timing at which the transistor 205 shifts from the conducting state to the non-conducting state and the timing at which the transistor 206 shifts from the non-conducting state to the conducting state are the same. This allows the changes in the potential of the common connecting line N2 due to the changes in the potential of the node N1 and the changes in the potential of the common connecting line N2 due to the changes in the potential of the gate of the transistor 202. This can reduce the changes in the potential of the common connecting line N2 more than a case in which the timing at which the transistor 205 shifts from the conducting state to the non-conducting state and the timing at which the transistor 206 shifts from the non-conducting state to the conducting state differ.

During time T4, the timing generator changes the signal PVLPWR1 from Lo level to Hi level. If the gate of the transistor 201 is directly connected to the common connecting line N2, the potential of the common connecting line N2 changes, as indicated by the broken line in FIG. 6, due to the parasitic capacitance Cgs of the transistor 201. In contrast, the image capturing apparatus 1 of this embodiment can reduce the changes in the potential of the common connecting line N2 due to the parasitic capacitance Cgs of the transistor 201 because of the presence of the transistor 205.

In this embodiment, the ratio of the gate width W to the gate length L of the transistor 201, W/L, is larger than that of the transistor 202. In another example, the ratio W/L of the gate width W to the gate length L of the transistor 201 may be smaller than that of the transistor 202.

The image capturing apparatus 1 of this embodiment can make three different amounts of current flow through the vertical signal line L1 by controlling the connections of the transistor 201 and the transistor 202 and by setting the ratios W/L of the transistor 201 and the transistor 202 different.

The image capturing apparatus 1 of this embodiment can have the same advantageous effects as those of the image capturing apparatus 1 of the second embodiment.

Fourth Embodiment

An image capturing apparatus 1 according to a fourth embodiment will be described, focusing on differences from the second embodiment.

Figure 7:
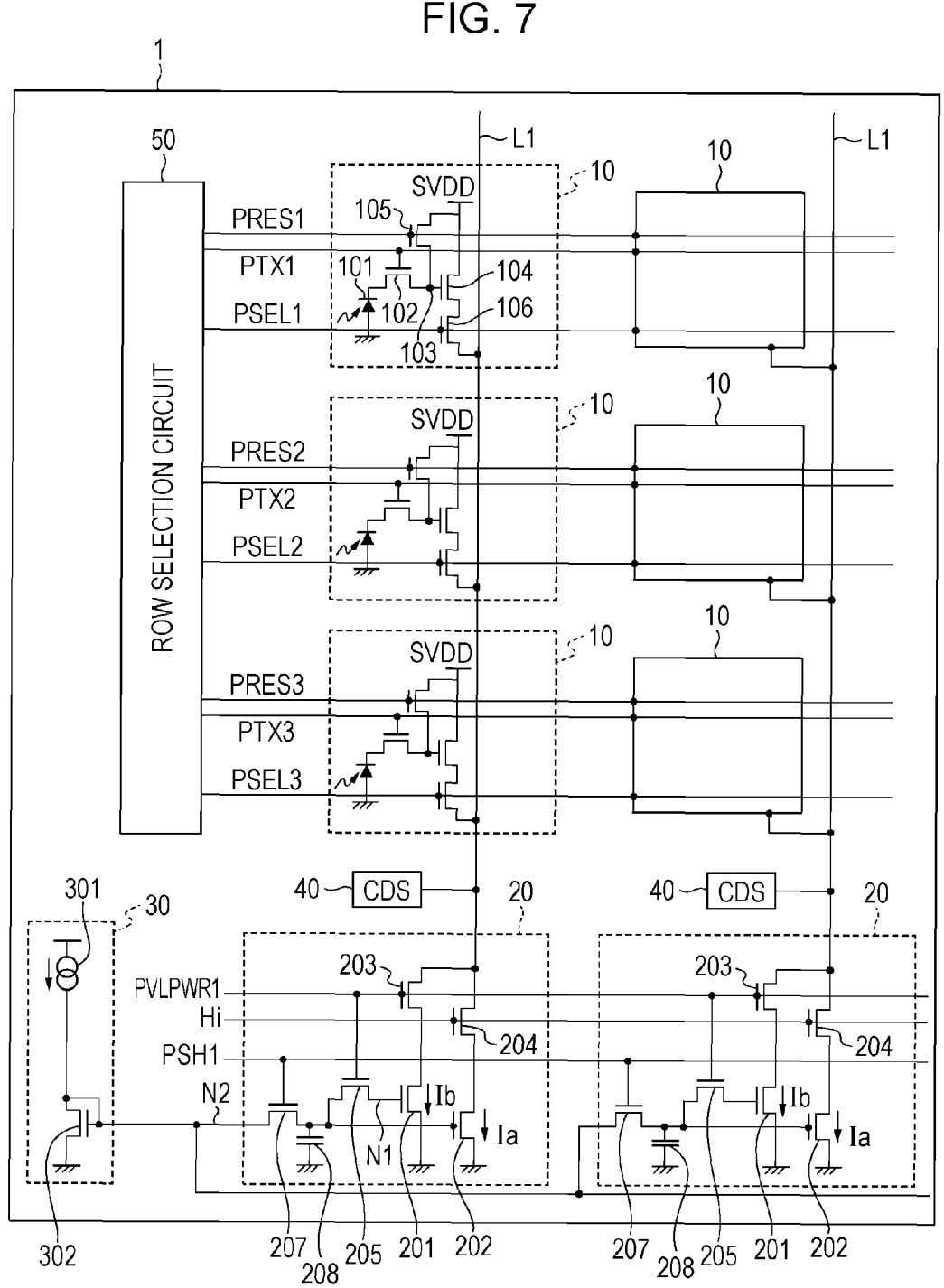
FIG. 7 is a diagram showing the configuration of an image capturing apparatus according to a fourth embodiment of the present invention.

FIG. 7 is a diagram showing the configuration of the image capturing apparatus 1 of this embodiment. Current sources 20 of the image capturing apparatus 1 of this embodiment each include a transistor 207 and a capacitive element 208. The transistor 207 is a fourth switch. The timing generator applies a signal PSH1 to the gate of the transistor 207. When the timing generator brings the signal PSH1 to Lo level, the transistor 207 is turned off. The capacitive element 208 holds the potential of the common connecting line N2 at the timing at which the transistor 207 is turned off. The current sources 20 in the individual columns supply current based on the potential held by the capacitive elements 208 to the vertical signal lines L1.

Figure 8:
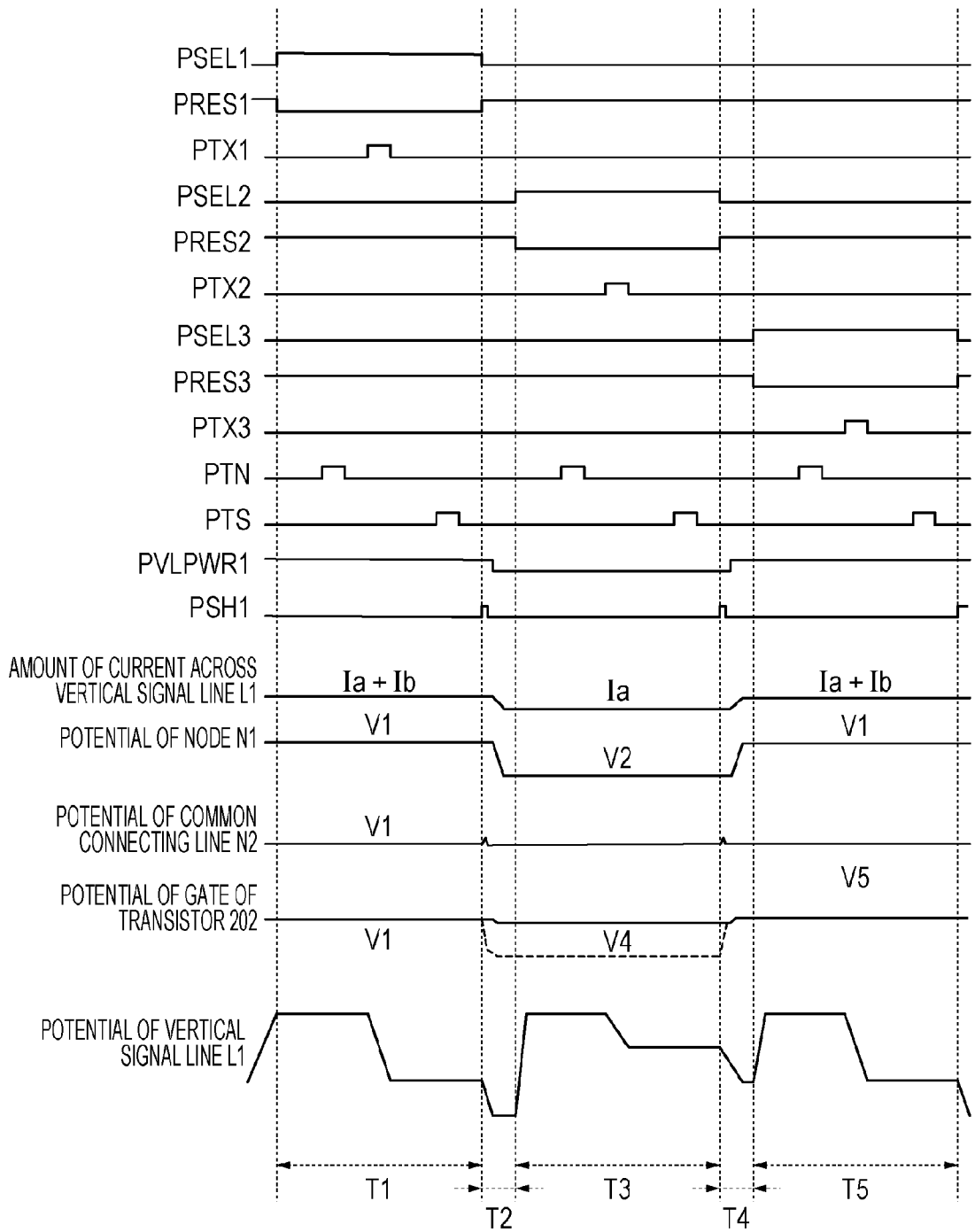
FIG. 8 is a diagram showing the operation of the image capturing apparatus according to the fourth embodiment of the present invention.

The operation of the image capturing apparatus 1 of this embodiment will be described with reference to FIG. 8.

During time T2, the timing generator brings the signal PSH1 to Hi level and then to Lo level. This causes the capacitive elements 208 of the current sources 20 in the individual columns to hold the potential of the common connecting line N2 when the signal PSH1 shifts from Hi level to Lo level.

Thereafter, the timing generator brings the signal PVLPWR1 to Lo level. The other operations are the same as those described in the second embodiment.

Problems caused when the gate of the transistor 201 and the capacitive element 208 are directly connected, without the current source 20 in the transistor 205, will now be described. The potential of the gate of the transistor 202 in this case is indicated by the dotted line in FIG. 8.

While the signal PVLPWR1 is at Lo level during time T2, the signal PSH1 is at Lo level, so that the electrical path between the capacitive element 208 and the common connecting line N2 is non-conducting. This causes changes in the potential of the gate of the transistor 201, which are caused by the signal PVLPWR1 at Lo level, to be superposed on the potential held in the capacitive element 208. This causes the potential of the gate of the transistor 202 during time T3, for example, to become a potential V4 different from the normal potential V1. This causes the amount of current that the transistor 202 supplies to the vertical signal line L1 to be a value different from Ia. Thus, if the current source 20 does not have the transistor 205, the accuracy of signals from the pixels 10 decreases.

In contrast, the image capturing apparatus 1 of this embodiment includes the transistor 205 that switches between conducting and non-conducting states of the electrical path between the capacitive element 208 and the transistor 201. This allows the image capturing apparatus 1 of this embodiment to hardly cause changes in the potential held by the capacitive element 208 and the potential of the gate of the transistor 202 even if the transistor 201 is switched between operating and non-operating states.

Next, differences from the image capturing apparatus 1 of the second embodiment will be described. In the image capturing apparatus 1 of the second embodiment, the gates of the transistors 202 of the current sources 20 in the individual columns are directly connected to the common connecting line N2. For this reason, when the potential of the common connecting line N2 changes due to the noise of the current generation unit 301 and the transistor 302 of the reference current source 30, the amounts of current supplied to the vertical signal lines L1 by the current sources 20 in all the columns change. This can cause horizontal streaks in the image generated from the image signals, causing degradation of the image quality.

In contrast, the current sources 20 in the individual columns of the image capturing apparatus 1 of this embodiment supply current based on the potentials held by the capacitive elements 208. This makes it hard to generate horizontal streaks in the image. If the potential of the GND wire changes due to the operation of the transistor 202, the potential of the first node of the capacitive element 208 changes together with the changes in the potential of the GND wire. This causes the potential of the gate of the transistor 202 to change together with the changes in the potential of the GND wire. To reduce the changes, a second node of the capacitive element 208 different from a first node connected to the gate of the transistor 202 and the source of the transistor 202 is connected to a common GND wire. This allows changes in the potential that the transistor 202 supplies to the vertical signal line L1 to be reduced even if the potential of the GND wire changes. The second node of the capacitive element 208 may be further connected to a GND wire connected to the source of the transistor 201.

The image capturing apparatus 1 of this embodiment can have the same advantageous effects as those of the image capturing apparatus 1 of the second embodiment. Furthermore, the image capturing apparatus 1 of this embodiment can output image signals from which an image with reduced horizontal streaks can be generated.

Fifth Embodiment

A fifth embodiment will be described, focusing on differences from the second embodiment.

Figure 9:
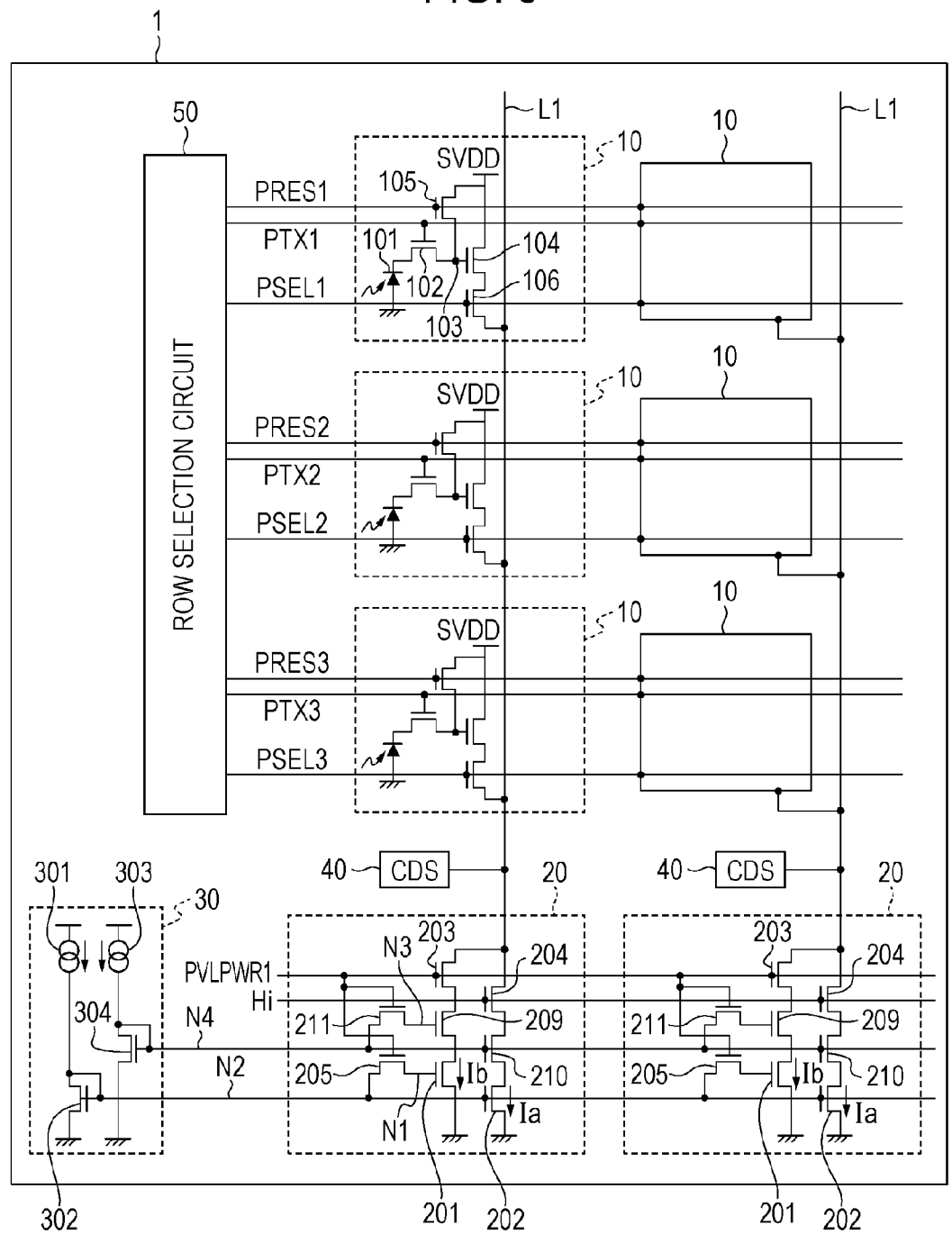
FIG. 9 is a diagram showing the configuration of an image capturing apparatus according to a fifth embodiment of the present invention.

FIG. 9 is a diagram showing the configuration of an image capturing apparatus 1 according to the fifth embodiment.

A reference current source 30 of the image capturing apparatus 1 of this embodiment further includes a current generation unit 303 and a transistor 304. Each of current sources 20 in the individual columns further includes a transistor 209 on the electrical path between the transistor 203 and the transistor 201. Each of the current sources 20 in the individual columns further includes a transistor 210 on the electrical path between the transistor 204 and the transistor 202. Each of the current sources 20 in the individual columns further includes a transistor 211. The transistor 211 is a fifth switch. The transistor 211 switches between conducting and non-conducting states of the electrical path between the transistor 304 and the transistor 209. The transistor 211 and the transistor 304 are electrically connected by a common connecting line N4. The gate of the transistor 211 is given the signal PVLPWR1.

The gate of the transistor 210 is connected to the transistor 304 through the common connecting line N4. The transistor 210 and the transistor 202 are cascode-coupled. The transistor 209 and the transistor 201 are also cascode-coupled.

The potentials of the gates of the transistor 209 and the transistor 210 are set so that each of the transistor 201 and the transistor 202 operates in a saturated region.

A current source 20 without the transistor 209 and the transistor 210 will now be described. When the transfer transistor 102 is turned on, so that the voltage of the vertical signal line L1 changes, a source-drain voltage Vds changes in each of the transistor 201 and the transistor 202. This reduces the amounts of current that the transistor 201 and the transistor 202 supply to the vertical signal line L1.

In contrast, the current source 20 of this embodiment includes the transistors 209 and 210. This allows changes in the potentials Vds of the transistor 201 and the transistor 202 to be reduced. This can further stable the amounts of current that the transistor 201 and the transistor 202 supply to the vertical signal line L1.

Figure 10:
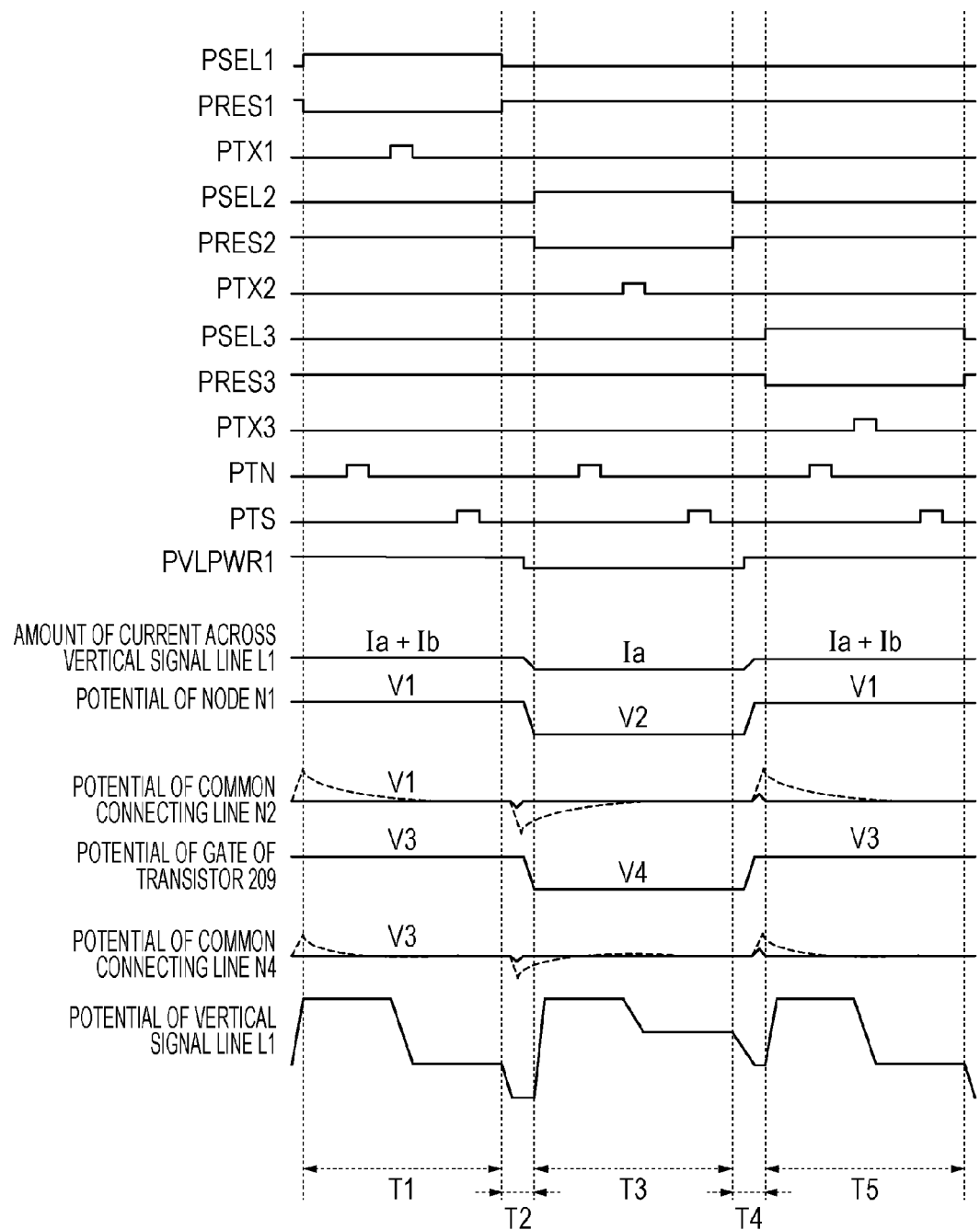
FIG. 10 is a diagram showing the operation of the image capturing apparatus according to the fifth embodiment of the present invention.

The operation of the image capturing apparatus 1 of this embodiment will be described with reference to FIG. 10.

The operations during time T1 to T5 are the same as those described in the second embodiment.

During time T2, the transistor 211 is turned off at the timing when the transistor 205 and the transistor 203 are turned off. This makes changes in the potential of the gate of the transistor 209 caused by turning off the transistor 203 less prone to be conveyed to the common connecting line N4 than a case in which the gate of the transistor 209 and the common connecting line N4 are directly connected together. In contrast, the potential of the common connecting line N4 would change without the transistor 211. The changes in the potential of the common connecting line N4 cause changes in the potential of the gate of the transistor 210, and the parasitic capacitance between the gate and the source of the transistor 210 changes the potential of the drain of the transistor 202. When the source-drain voltage Vds of the transistor 202 changes, the amount of current that the transistor 202 supplies to the vertical signal line L1 also changes.

In contrast, the image capturing apparatus 1 of this embodiment can reduce changes in the potential of the gate of the transistor 210 due to changes in the potential of the gate of the transistor 209. This can also reduce changes in Vds of the transistor 202, thereby more stabilizing the amount of current that the transistor 202 supplies to the vertical signal line L1.

In the image capturing apparatus 1 of this embodiment, signals applied to the gates of the transistor 211 and the transistor 205 may be the signal PGCUT1, as in the image capturing apparatus 1 of the first embodiment.

Sixth Embodiment

An image capturing apparatus 1 of a sixth embodiment will be described, focusing on differences from the fifth embodiment.

Figure 11:
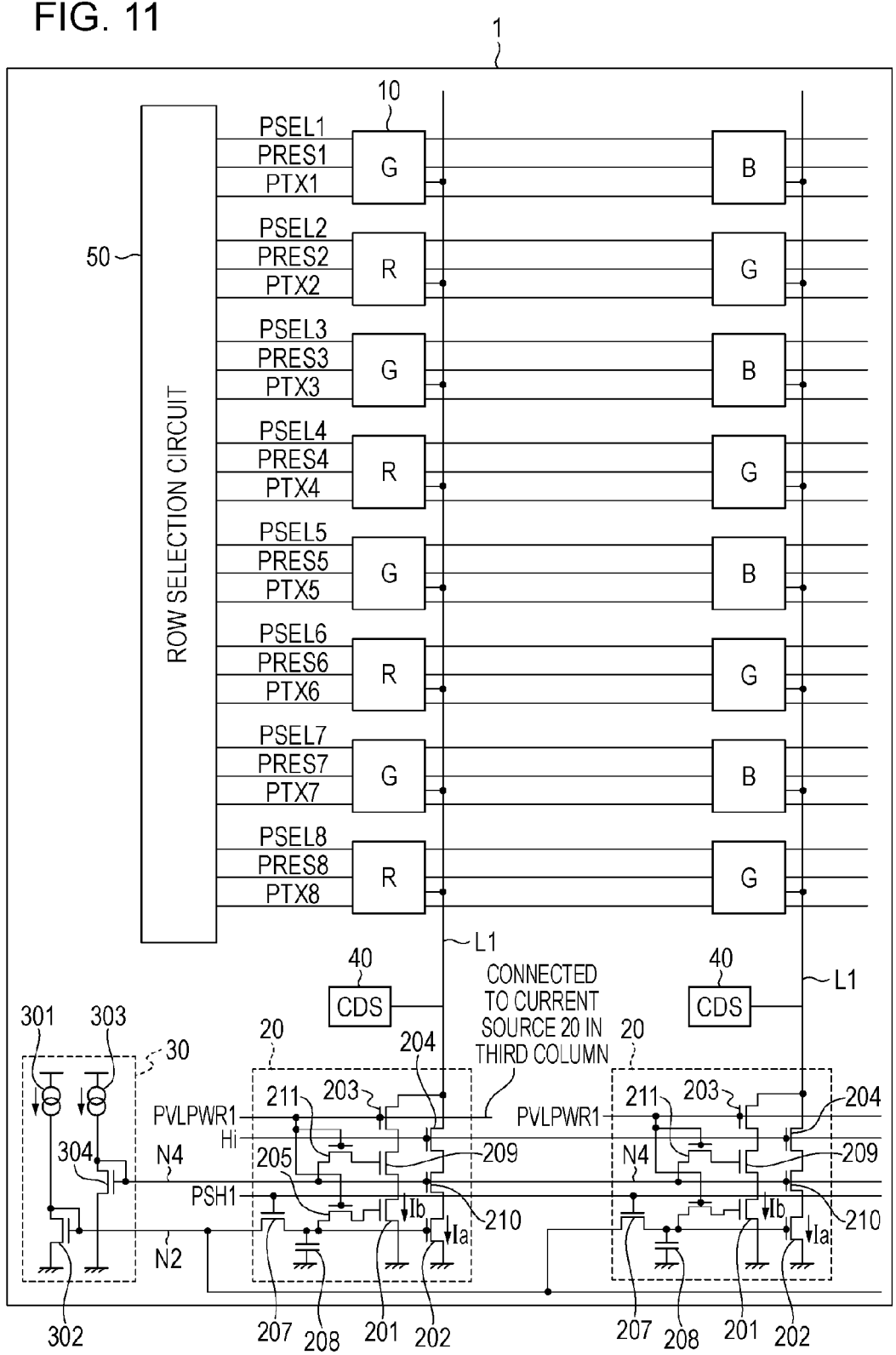
FIG. 11 is a diagram showing the configuration of an image capturing apparatus according to a sixth embodiment of the present invention.

FIG. 11 is a diagram showing the configuration of the image capturing apparatus 1 of this embodiment. Pixels 10 arrayed in a matrix form each include a color filter. The color filters are Bayer array filters. Symbols R, G, and B shown in FIG. 11 indicates that red, green, and blue color filters are disposed, respectively. Pixels in which R, G, and B color filters are disposed are hereinafter referred to as an R pixel, a G pixel, and a B pixel, respectively. A plurality of pixels 10 which are connected to the common vertical signal line L1 and in which G color filters are disposed constitute a first pixel group. A plurality of pixels 10 which are connected to the common vertical signal line L1 and in which R or B color filters are disposed constitute a second pixel group.

The pixels 10 of the image capturing apparatus 1 of this embodiment have the same configuration except the colors of the color filters. Accordingly, difference in sensitivity among the rows of the pixels 10 depends on the color-by-color characteristics of the color filters. If the same quantity of light is incident on the R, G, and B pixels 10, the amplitude of the photoelectric conversion signals from the G pixels tends to be larger than the amplitude of the photo-electric conversion signals from the other R and B pixels because of the characteristics of the color filters. In other words, the G pixels have higher sensitivity than that of the R pixels and the B pixels. For this reason, the image capturing apparatus 1 of this embodiment is configured such that the amount of current supplied to the vertical signal line L1 is larger for reading signals from the G pixels than for reading signals from the R pixels and the B pixels. This allows for high-speed reading of signals from the G pixels whose signal amplitudes tend to be large.

The image capturing apparatus 1 of this embodiment performs an operation to mix signals output from a plurality of pixels 10 having the same color filters, among the plurality of pixels 10 connected to the same vertical signal line L1, on the vertical signal line L1. This allows signals from pixels 10 in a plurality of rows to be read at a time, thus making the time from the start of scanning all the pixel rows to the end shorter than the time for reading signals from the pixels 10 row by row.

In the case where signals from the plurality of pixels 10 are mixed on the vertical signal line L1, an increase in the potential difference among the charge-voltage conversion units 103 of the plurality of pixels 10 decreases the accuracy of the mixing. This is because current hardly flows through the amplifying transistors 104 of pixels 10 whose charge-voltage conversion units 103 have low potentials among the plurality of pixels 10. In this case, the decrease in the accuracy of the mixing can be prevented by increasing the amount of current supplied to the vertical signal line L1.

Mixing among the G pixels is more likely to cause a difference in amplitude among the photoelectric conversion signals than mixing among the R pixels or the B pixels because the sensitivity of the G pixels is higher than those of the R pixels and the B pixel. The image capturing apparatus 1 of this embodiment therefore supplies a larger amount of current to the vertical signal line L1 when mixing signals from the G pixels than that for the R pixels and the B pixels.

Figure 12:
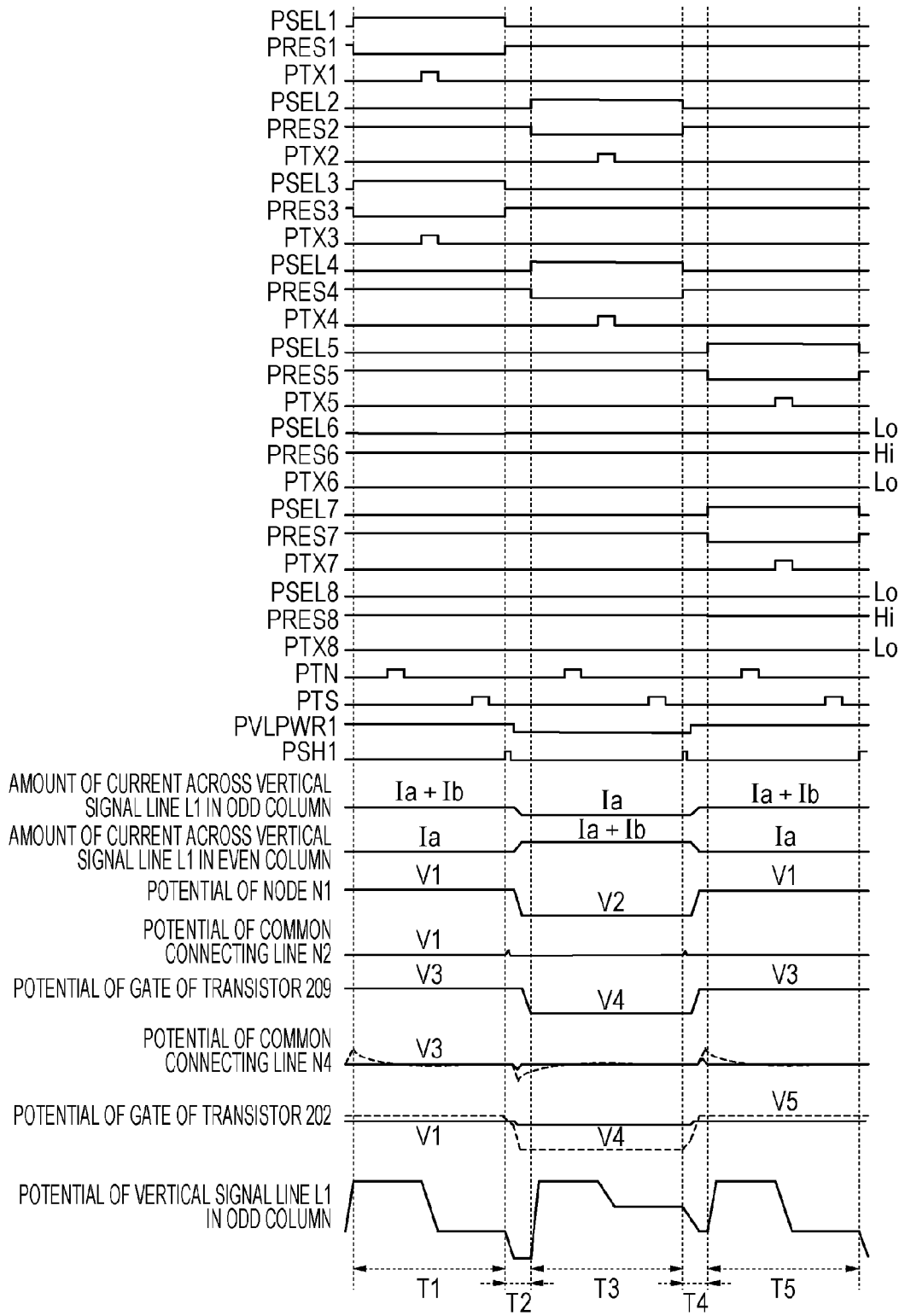
FIG. 12 is a diagram showing the operation of the image capturing apparatus according to the sixth embodiment of the present invention.

Referring to FIG. 12, the operation of the image capturing apparatus 1 of this embodiment will be described. The signal PSEL1 to the signal PTX8 are signals shown in FIG. 11. The operations on the signal PSEL1 to the signal PTS will be omitted because they are the same as those in the other embodiments.

During time T1, the row selection circuit 50 brings the signal PSEL1 and the signal PSEL3 to Hi level. This causes signals from the pixels 10 in the first row and the pixels 10 in the third row to be mixed together on the vertical signal lines L1.

Signals from the G pixels are mixed on the vertical signal lines L1 in the odd columns. On the other hand, signals from the B pixels are mixed on the vertical signal lines L1 in the even columns.

The timing generator brings the signal PVLPWR1 to Hi level. This causes the vertical signal lines L1 in the odd columns on which signals from the G pixels are mixed to be supplied with current of amount Ia+Ib from the current sources 20 in the odd columns. On the other hand, the vertical signal lines L1 in the even columns on which signals from the B pixels are mixed are supplied with a current of Ia from the current sources 20 in the even columns to which an inverted signal of the signal PVLPWR1 is applied.

During time T3, the row selection circuit 50 brings the signal PSEL2 and the signal PSEL4 to Hi level. This causes signals from the pixels 10 in the second row and signals from the pixels 10 in the fourth row to be mixed together on the vertical signal lines L1.

Signals from the R pixels are mixed on the vertical signal lines L1 in the odd columns. On the other hand, signals from the G pixels are mixed on the vertical signal lines L1 in the even columns.

The timing generator brings the signal PVLPWR1 to Lo level. This causes the vertical signal lines L1 in the odd columns on which signals from the R pixels are mixed to be supplied with current of an amount of Ia from the current sources 20 in the odd columns. In contrast, the vertical signal lines L1 in the even columns on which signals from the G pixels are mixed are supplied with current of an amount of Ia+Ib from the current sources 20 in the even columns to which an inverted signal of the signal PVLPWR1 is applied.

In this manner, the image capturing apparatus 1 of this embodiment supplies a larger amount of current to the vertical signal lines L1 in mixing the G pixels than in mixing the R pixels and the B pixels. This allows for high-speed reading of mixed signals from the G pixels and improving the accuracy of mixing of signals from the G pixels. Furthermore, since the amount of current supplied to the vertical signal lines L1 in mixing signals from the R pixels and mixing signals from the B pixels is Ia, the image capturing apparatus 1 of this embodiment can reduce power consumption as compared with a case in which the amount of current is Ia+Ib.

In this embodiment, the operation to mix signals from pixels 10 in a plurality of rows has been described. The image capturing apparatus 1 of this embodiment may further perform an operation to read signals from the pixels 10 in the individual rows. In this case, the amount of current supplied to the vertical signal lines L1 is set constant at Ia+Ib to achieve high-speed reading of signals from the individual pixels 10.

In this embodiment, a larger amount of current is supplied to the vertical signal lines L1 in mixing signals from the G pixels than in mixing signals from the R pixels and mixing signals from the B pixels. In another example, the following operation is performed for an imaging scene in which the potential difference among the charge-voltage conversion units 103 of the R pixels is large. A larger amount of current is supplied to the vertical signal line L1 in mixing signals from the R pixels than in mixing signals from the G pixels and signals from the B pixels. This allows good mixing of signals from the R pixels. Although the embodiment has been described as applied to the color image capturing apparatus, this embodiment can also be applied to an operation to mix signals from pixels in a plurality of rows or in a plurality of columns in a monochrome image capturing apparatus. If each pixel has a plurality of photoelectric conversion units, this can also be applied to an operation to read signals from the plurality of photoelectric conversion units and an operation to read a mixture of signals from the plurality of photoelectric conversion units.

The current sources 20 of this embodiment each include the transistor 205 and the transistor 211. This allows the image capturing apparatus 1 of this embodiment to have the same advantages as those of the image capturing apparatus 1 of the fifth embodiment.

Seventh Embodiment

Figure 13:
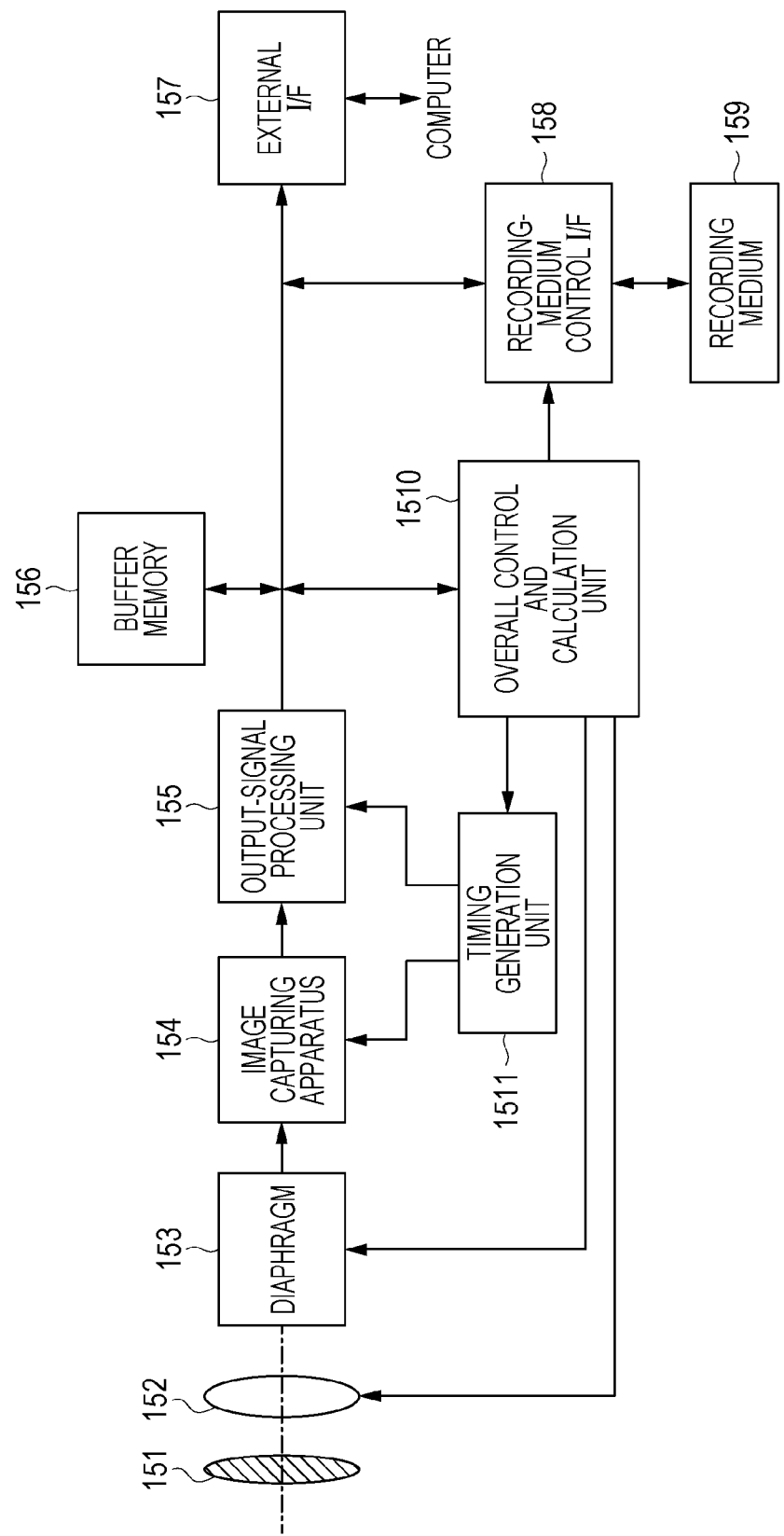
FIG. 13 is a diagram showing the configuration of an image capturing system according to an embodiment of the present invention.

The image capturing apparatuses 1 described in the above embodiments can be applied to various image capturing systems. Examples of the image capturing systems include a digital still camera, a digital camcorder, and a surveillance camera. FIG. 13 is a diagram showing an image capturing system according to an embodiment of the present invention in which one of the image capturing apparatus 1 of the above embodiments is applied to a digital still camera.

The image capturing system shown in FIG. 13 includes an image capturing apparatus 154, a lens 152 for forming an optical image of an object on the image capturing apparatus 154, a barrier 151 for protecting the lens 152, and a diaphragm 153 for varying the amount of light that passes through the lens 152. The lens 152 and the diaphragm 153 constitute an optical system for collecting light to the image capturing apparatus 154. The image capturing apparatus 154 is one of the image capturing apparatuses 1 of the above embodiments. The image capturing system shown in FIG. 13 further includes an output-signal processing unit 155 that processes signals output from the image capturing apparatus 154. The output-signal processing unit 155 generates an image on the basis of signals output from the image capturing apparatus 154. Specifically, the output-signal processing unit 155 outputs image data through various corrections and compression as needed.

The image capturing system shown in FIG. 13 further includes a buffer memory 156 for temporarily storing the image data and an external interface (external I/F) 157 for communicating with an external computer or the like. The image capturing system further includes a recording medium 159, such as a semiconductor memory, to/from which imaging data is recorded or read, and a recording-medium control interface (recording-medium control I/F) 158 for recording or reading imaging data to/from the recording medium 159. The recording medium 159 may be either accommodated in the image capturing system or detachably mounted.

The image capturing system further includes an overall control and calculation unit 1510 that controls various calculations and the whole of the digital still camera and a timing generation unit 1511 that outputs various timing signals to the image capturing apparatus 154 and the output-signal processing unit 155. The timing signals, etc. may be output from the outside, so the image capturing system needs at least the image capturing apparatus 154 and the output-signal processing unit 155 that processes signals output from the image capturing apparatus 154.

As described above, the image capturing system of the embodiment can perform an image capturing operation using the image capturing apparatus 154.

It is to be understood that the above embodiments are mere specific examples of the present invention and that the technical scope of the present invention should not be restrictively interpreted by the embodiments. The present invention can be implemented in various forms without departing from the technical spirit and its principal features.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-243566, filed Dec. 1, 2014, which is hereby incorporated by reference herein in its entirety.

What is claimed is:
1. An apparatus comprising:
 a plurality of pixels arranged in rows and columns and each including a photoelectric conversion unit and an amplifying transistor to which an electric charge generated by the photoelectric conversion unit is input;
 a plurality of vertical signal lines disposed in correspondence with the columns of the plurality of pixels and each connected to the amplifying transistor of each pixel in a corresponding one of the columns;
a plurality of current sources each connected to a corresponding one of the plurality of vertical signal lines; and
a reference current source connected in common to the plurality of current sources through a first common connecting line;
wherein each of the plurality of current sources includes:
a first transistor connected to a corresponding one of the vertical signal lines to constitute a source follower circuit together with the amplifying transistor;
a first switch;
a second transistor connected to a corresponding one of the vertical signal lines via the first switch to constitute a source follower circuit together with the amplifying transistor; and
a second switch;
wherein a gate of the first transistor is connected to the first common connecting line; and
wherein a gate of the second transistor is connected to the first common connecting line via the second switch.

2. The image capturing apparatus according to claim 1, wherein the second switch is brought from a conducting state into a non-conducting state, and thereafter the first switch is brought from a conducting state into a non-conducting state.

3. The image capturing apparatus according to claim 1, wherein the first switch and the second switch are switched between a conducting state and a non-conducting state in response to a common signal.

4. The image capturing apparatus according to claim 1, wherein each of the plurality of current sources further includes a third switch on an electrical path between the first common connecting line and the second transistor and between the gate of the first transistor and the second switch.

5. The image capturing apparatus according to claim 4, wherein a ratio of a gate length to a gate width of the first transistor and a ratio of a gate length to a gate width of the second transistor differ.

6. The image capturing apparatus according to claim 1, further comprising a fourth switch and a capacitive element on an electrical path between the second transistor and the first common connecting line;
wherein the capacitive element holds a potential of the first common connecting line as a result of switching of the fourth switch from a conducting state to a non-conducting state; and
wherein the second transistor supplies current to a corresponding one of the vertical signal lines based on the potential held in the capacitive element.

7. The image capturing apparatus according to claim 1, wherein each of the plurality of current sources includes a third transistor cascode-connected to the first transistor and a fourth transistor cascode-connected to the second transistor.

8. The image capturing apparatus according to claim 7, wherein the reference current source and a gate of the fourth transistor of each of the plurality of current sources are connected with a second common connecting line; and
wherein each of the plurality of current sources further includes a fifth switch that switches between a conducting state and a non-conducting state of an electrical path between the second common connecting line and the gate of the fourth transistor.

9. The image capturing apparatus according to claim 8, wherein the second switch and the fifth switch are switched between a conducting state and a non-conducting state in response to a common signal.

10. An image capturing system comprising:
an image capturing apparatus; and
an output-signal processing unit configured to generate an image using a signal output from the apparatus;
wherein the apparatus includes:
a plurality of pixels arranged in rows and columns and each including a photoelectric conversion unit and an amplifying transistor to which an electric charge generated by the photoelectric conversion unit is input;
a plurality of vertical signal lines disposed in correspondence with the columns of the plurality of pixels and each connected to the amplifying transistor of each pixel in a corresponding one of the columns;
a plurality of current sources each connected to a corresponding one of the plurality of vertical signal lines; and
a reference current source connected in common to the plurality of current sources through a first common connecting line;
wherein each of the plurality of current sources includes:
a first transistor connected to a corresponding one of the vertical signal lines to constitute a source follower circuit together with the amplifying transistor;
a first switch;
a second transistor connected to a corresponding one of the vertical signal lines via the first switch to constitute a source follower circuit together with the amplifying transistor; and
a second switch;
wherein a gate of the first transistor is connected to the first common connecting line; and
wherein a gate of the second transistor is connected to the first common connecting line via the second switch.

11. The image capturing system according to claim 10, wherein the second switch is brought from a conducting state into a non-conducting state, and thereafter the first switch is brought from a conducting state into a non-conducting state.

12. The image capturing system according to claim 10, wherein the first switch and the second switch are switched between a conducting state and a non-conducting state in response to a common signal.

13. The image capturing system according to claim 10, wherein each of the plurality of current sources further includes a third switch on an electrical path between the first common connecting line and the second transistor and between the gate of the first transistor and the second switch.

14. The image capturing system according to claim 10, where in the apparatus further comprises a fourth switch and a capacitive element on an electrical path between the second transistor and the first common connecting line;
wherein the capacitive element holds a potential of the first common connecting line as a result of switching of the fourth switch from a conducting state to a non-conducting state; and
wherein the second transistor supplies current to a corresponding one of the vertical signal lines based on the potential held in the capacitive element.

15. The image capturing apparatus according to claim 10, wherein each of the plurality of current sources includes a third transistor cascode-connected to the first transistor and a fourth transistor cascode-connected to the second transistor.

16. A method for driving the image capturing apparatus comprising:
 arranging a plurality of pixels in rows and columns and each including a photoelectric conversion unit and an amplifying transistor that outputs a photoelectric conversion signal based on an electric charge generated by the photoelectric conversion unit;
 disposing a plurality of vertical signal lines in correspondence with the columns of the plurality of pixels and each configured to receive the photoelectric conversion signal from the amplifying transistor of each pixel in a corresponding one of the columns wherein
 a plurality of current sources each connects to a corresponding one of the plurality of vertical signal lines; and
 a reference current source connects in common to the plurality of current sources through a first common connecting line;
 wherein each of the plurality of current sources includes:
  a first transistor connected to a corresponding one of the vertical signal lines to constitute a source follower circuit together with the amplifying transistor;
  a first switch;
  a second transistor connected to a corresponding one of the vertical signal lines via the first switch to constitute a source follower circuit together with the amplifying transistor; and
  a second switch,
 wherein the second switch is non-conducting during a period in which the first switch is switched from a conducting state to a non-conducting state or from a non-conducting state to a conducting state,
 wherein the plurality of pixels include a first pixel group and a second pixel group, the first pixel group including color filters of a first color and connected to a corresponding one of the vertical signal lines, and the second pixel group including color filters of a second color and connected to a corresponding one of the vertical signal lines,
 wherein when the photoelectric conversion signals of the pixels in the first pixel group are mixed together on the vertical signal line, the first switch is conducting to supply current from the first transistor and the second transistor to the vertical signal line; and
 wherein when the photoelectric conversion signals of the pixels in the second pixel group are mixed together on the vertical signal line, the first switch is non-conducting to supply current from the second transistor to the vertical signal line.

17. The method for driving the image capturing apparatus according to claim 16, wherein the first color is green, and the second color is blue or red.

* * * * *